May 2, 1944.  L. TYSON  2,347,854
UNIVERSALLY ADJUSTABLE CLAMPING MACHINE
Filed April 5, 1943
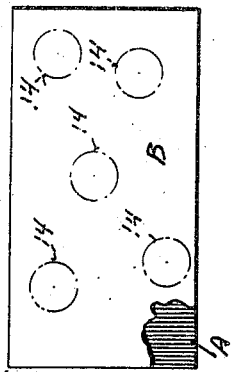
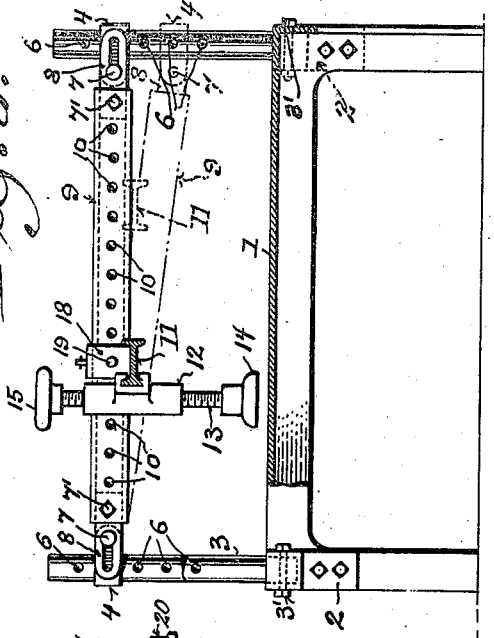
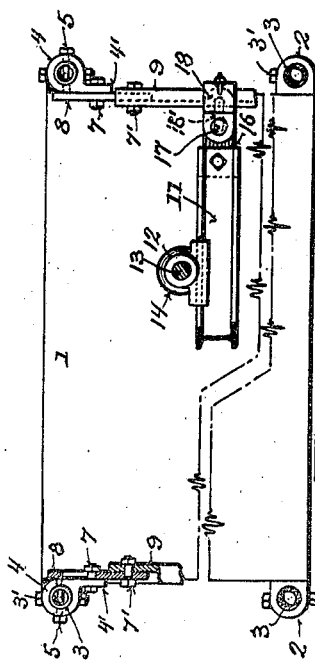
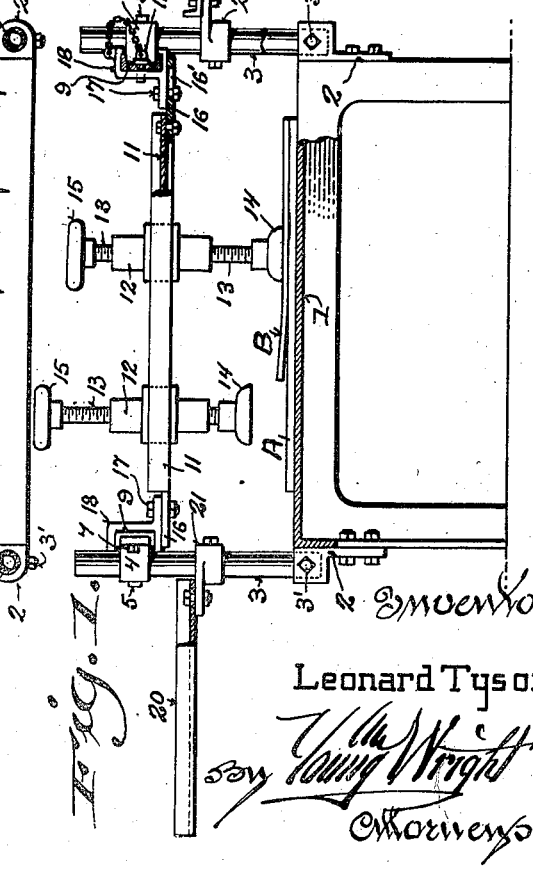
Inventor
Leonard Tyson Patented May 2, 1944

2,347,854

UNITED STATES PATENT OFFICE 2,347,854

UNIVERSALLY ADJUSTABLE CLAMPING MACHINE

Leonard Tyson, Manitowoc, Wis.

Application April 5, 1943, Serial No. 481,872

2 Claims. (Cl. 29—89)

My invention has for its primary object to provide a universally adjustable clamping device particularly adapted for bending and holding sheet materials preparatory to attaching the same to each other, whereby man power for this type of work is reduced to a minimum and speed of production is facilitated.

Another object of my invention is to provide a clamping device or rigging embodying a plurality of power jacks, whereby sheet materials are flattened out or formed in curves about a base, which may be boat sections of a hull of a ship, tanks or planes, it being understood that after the sheet or sheets are formed about its core base, the parts so formed are suitably secured, as for example by welding.

One of the specific objects of my invention is to provide a clamping rig carrying a series of jacks capable of universal adjustment, whereby pressure may be imparted to metallic plates preparatory to welding the same, it being understood that such super-imposed plates must be firmly placed together to insure weld seams.

A further object of my invention contemplates feeding flat bars, angle iron bars, or T bars to plates and welding or securing the same together.

It is also within the scope of my invention to secure together materials of any kind similar in shape, either metal, wood or plastic, etc.

It is also contemplated to use the clamping rig in connection with any type of table or jig or the same may be anchored to or suspended from the side walls of a building or under certain conditions it may be mounted upon a track, whereby said rigging may be moved back and forth with reference to the shape to facilitate welding and handling sheets of metal for the purpose of compressing the same together prior to effecting a welding operation, either of the spot or seam variety. It is also possible to support the device from a ceiling or it may be supported by radial swinging arms. In other words, the device is capable of any simple mechanical arrangement, whereby it may be anchored or moved from place to place.

In practice it should also be understood that the power jacks, which are universally adjustable, may be arranged to compress the sheets of metal worked upon either from the top or bottom surfaces and under certain conditions a unit of the clamping device may be secured directly upon the bottom sheet of a pair of such sheets, which are to be compressed together prior to welding, whereby the surfaces will be universally held in contact irrespective of the shape of said surfaces.

It is also understood, in the development of my invention, I may employ any type of power driven clamps, utilizing either manual, electrical, pneumatic or hydraulic means for exerting the clamping pressure.

Another object of my invention is to provide pairs of pipe supports having detachable feet at their bottom ends and adjustable rails at their top ends for the support of a jack carrying rail or rails, whereby the jacks may be adjusted horizontally or vertically or at predetermined angles corresponding to the angles of the sheets of material to be welded.

With the above and other minor objects in view, my invention consists in certain peculiarities of construction and combination of parts as will be hereinafter set forth with reference to the accompanying drawing and subsequently claimed.

In the drawing:

Figure 1 represents an end, elevational view of a clamping device embodying the features of my invention with parts thereof broken away and in section to more clearly illustrate structural features.

Figure 2 is a side, elevational view of the same with parts broken away and in section to more clearly illustrate structural features.

Figure 3 is a fragmentary, plan view of said device with parts broken away and in section to illustrate structural detail.

Figure 4 is a diagrammatic view of a pair of plates illustrating in dotted lines a group of jacks for compressing the plates together prior to a welding operation.

Referring by characters to the drawing, I indicates a standard leg table having bolted thereto sets of feet brackets 2, the upper ends of which brackets are cupped for the reception of the ends of vertically disposed supporting pipes or posts 3, which pipes are held in the cups by bolts 3', as shown.

The pipes, at their upper ends, have slidably mounted thereon collars 4 with inwardly extended ears 4' and said collars are adjusted to any predetermined position with relation to the table and locked in said position by bolts 5, which bolts engage any one of a series of apertures 6. As best shown in Figure 2 of the drawing, the collar ears 4' carry bolts 7, which bolts engage slotted tongues 8 that are aligned in pairs with their inner ends fitted into channeled track-bars 9 and secured in the ends of said track-bars by bolts 7'. Thus the collars and tongues form couplings for securely anchoring the track-bars. As indicated in Figure 2 of the drawing, the angle iron track-bars are positioned parallel to the table 1 and said bars are provided with a series of apertures 10 extending throughout their lengths.

The pairs of track-bars 9 are adapted to support a U-shape angle iron rail 11, the webs of which rail have slidably mounted thereon the heads 12 of any standard jacks, which heads in this exemplification of my invention have extended therethrough threaded spindles 13 carrying at their lower ends any type of pad or foot 14 and terminate at their upper ends with suitable hand wheels 15.

It is understood that these spindles and pads may be of any desired formation and dimension consistent with the work required and as previously stated, while these jacks are adapted to be manually manipulated, any source of power other than mechanical, may be employed. It is further understood that while I have illustrated a pair of jacks adjustably mounted upon the rail, the number of jacks may be varied in accordance with the work and furthermore I may employ a plurality of the jack supporting rails and their equipment.

As best illustrated in Figures 1 and 3 of the drawing, the jack supporting rails have end couplings embodying tongue plates 16, which are bolted or otherwise secured to the ends of the rails and the outer ends of said tongues are formed with slots 16' for the reception of anchor bolts 17, which bolts pass through the slots 16' and inwardly extended ears of clips 18, which clips engage the webs of the track-bars 9 and are adapted to slide back and forth upon the same for selective adjustment, whereby the pads 14 of the jacks are brought into the desired position for compressing or buttoning down pairs of sheet metal plates A and B as shown in Figure 1 of the drawing, the plates being supported upon the table or bed 1.

After the desired adjustment of the jack supporting rail 11, said rail is locked in its adjusted position by pins 19 that pass through perforations in the clips 18 and apertures 10 of said track-bar. It being noted in Figure 1 of the drawing, that for convenience these pins are suitably anchored to the clips by chain connections.

Due to the flexible couplings between the jack carrying rails and track-bars, it will be noted that the rails may be positioned at right angles to their supporting bars or they may be located at a desired selected angle thereto, whereby the pads of the jacks are michromically positioned with relation to the plates which are compressed or clamped together and said angle position is compensated for, due to the slotted connection between the tongue plates and clips, whereby the length of the rail is shortened or extended.

As indicated by dotted lines in Figure 2 of the drawing, the pairs of track-bars 9 may also be adjusted from their vertical position to an angle position by the sliding adjustment of the couplings, which are supported upon the pipes or posts 3, whereby the jacks are thereby set at an angle to the plate supporting table, in the event that said plates to be welded are of angular shape. In practice, it should be borne in mind that said metal plates to be welded are more or less warped and hence the plurality of jacks not only firmly clamps the plates together, but they also flatten the same smoothly throughout the warped surfaces to insure a proper welding operation.

When it is desired to attach the clamping device to a jig or other suitable support, the feet 2 are detached from the table 1 and the bolts are affixed to the jig equipment. Furthermore, when it is desired to attach the equipment to the wall of a building or other suitable support, I provide arms 20, which arms are pivotally connected to brackets 21 which are secured to the supporting pipes, as shown in Figure 1.

When it is desired to weld metal plates of large area, the lower ends of the supporting pipes or posts may have fitted thereto metal pads, which pads are bolted or tack welded to one of the plates, whereby the jacks are firmly anchored preparatory to exerting pressure upon the two plates to be welded and after a section of the plates are welded together, the tack weld confining the pipe supports, may be broken and the apparatus is then moved to another position, whereby the welding operation is continued step by step. This operation may also be accomplished by removing the jack carrying rail from the equipment and bolting thereon at its ends, suitable depending feet, which would also be tack welded to one of the plates for compression of the same together and it is understood that this pressure may be either from the top surface or bottom surface of said plates and said last mentioned welding method is particularly desirable where large curved surfaces of the plates must be compressed, which under ordinary conditions, in practice, has up to this time only been accomplished by actual man power.

While I have shown and described one way of producing my device, it is understood that the structural features, such as the posts, rails, beams, etc., may be varied indefinitely as to form, without departing from the spirit of my invention.

I claim:

1. A clamping machine for holding super-imposed plates adapted to be welded, the same comprising a work table, corner posts associated therewith, each having a series of locking apertures, companion pairs of longitudinally apertured track-bars, a slidable pair of collars mounted on each pair of posts, tongues connecting the collars and ends of each track-bar, locking pins engaging the collars and posts, whereby the position of said track-bars are adjusted with relation to the table, slidable couplings mounted upon the aforesaid track-bars, a rail secured to the couplings and jacks in slidable connection with the rails.

2. A clamping machine for holding super-imposed plates adapted to be welded, the same comprising a table, corner posts associated therewith, track-bars having couplings at their ends in adjustable connection with each pair of posts, slidable coupling connections mounted upon the track-bars, a rail secured to the couplings, a jack adjustably mounted upon said rail, the couplings associated with the track-bars permitting horizontal or angular adjustment of said bars and the couplings associated with the rails permitting horizontal and angular adjustment of said rail, whereby the position of the jack is set to accommodate right angle pressure upon the super-imposed plates.

LEONARD TYSON.